US006717687B2

(12) United States Patent
Nagata

(10) Patent No.: US 6,717,687 B2
(45) Date of Patent: *Apr. 6, 2004

(54) PERIPHERAL WITH SELECTABLE CONTROL PROGRAM

(75) Inventor: Satoshi Nagata, Tama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/184,031

(22) Filed: Nov. 2, 1998

(65) Prior Publication Data

US 2001/0043348 A1 Nov. 22, 2001

Related U.S. Application Data

(62) Division of application No. 08/774,001, filed on Dec. 26, 1996, now Pat. No. 5,861,957, which is a continuation of application No. 08/286,990, filed on Aug. 8, 1994, now abandoned, which is a continuation of application No. 07/983,254, filed on Nov. 30, 1992, now abandoned, which is a continuation of application No. 07/679,111, filed on Apr. 2, 1991, now abandoned.

(30) Foreign Application Priority Data

Apr. 5, 1990 (JP) .............................................. 2-91450

(51) Int. Cl.⁷ ............................................... G06K 15/00
(52) U.S. Cl. ...................................... 358/1.13; 358/1.1
(58) Field of Search ........................... 358/1.1, 1.9, 1.11, 358/1.12, 1.13, 1.14, 1.15, 1.16, 296, 444, 502, 524, 468; 711/170, 100, 101, 115; 345/520, 521, 508, 512, 203

(56) References Cited

U.S. PATENT DOCUMENTS 3,964,591 A    6/1976    Hill ........................... 346/75 X (List continued on next page.)

FOREIGN PATENT DOCUMENTS

| DE | 3501569 | 1/1985 |
|----|---------|--------|
| GB | 2182471 | 5/1987 |
| JP | 61-177255 | 8/1986 |
| JP | 61-197252 | 9/1986 |
| JP | 63-216125 | 9/1989 |
| JP | 1-314176 | 12/1989 |

Primary Examiner—Gabriel Garcia
(74) Attorney, Agent, or Firm—Fitzpatrick, Cella, Harper & Scinto

(57) ABSTRACT

An image outputting apparatus has a removably mounted auxiliary memory device for prestoring control programs process print information conforming to a command system. The auxiliary memory device is capable of storing several control programs at one time and the execution of any one of the control programs stored in the auxiliary memory device can be easily selected without a cumbersome cartridge interchange process.

12 Claims, 3 Drawing Sheets

U.S. PATENT DOCUMENTS

| | | | |
|---|---|---|---|
| 4,441,164 A | * 4/1984 | Pavan et al. | 358/1.16 |
| 4,660,998 A | 4/1987 | Tsuneki | 400/121 X |
| 4,660,999 A | 4/1987 | Tsuneki | 400/121 X |
| 4,686,525 A | 8/1987 | Nagata | 340/790 |
| 4,715,006 A | 12/1987 | Nagata | 364/523 |
| 4,742,483 A | 5/1988 | Morrell | 364/900 |
| 4,745,561 A | 5/1988 | Hirosawa et al. | 364/523 |
| 4,751,583 A | 6/1988 | Levine | 358/403 |
| 4,763,281 A | 8/1988 | Arakawa | 364/523 |
| 4,777,355 A | * 10/1988 | Takahira | 235/380 |
| 4,837,712 A | 6/1989 | Shibamiya | 364/523 |
| 4,860,119 A | 8/1989 | Maniwa | 358/296 |
| 4,901,249 A | * 2/1990 | Shiota | 358/1.16 |
| 4,980,856 A | 12/1990 | Ueno | 364/900 |
| 5,043,918 A | 8/1991 | Murahashi | 364/519 |
| 5,051,925 A | 9/1991 | Kadono | 364/519 |
| 5,138,696 A | 8/1992 | Nagata | 395/110 |
| 5,171,092 A | 12/1992 | Tasaki | 400/121 |
| 5,321,839 A | * 6/1994 | Murakami et al. | 711/170 |
| 5,471,322 A | * 11/1995 | Murata | 358/502 |
| 5,567,061 A | 10/1996 | Nagata | 400/61 |
| 5,861,957 A | * 1/1999 | Nagata | 358/296 |
| 5,878,275 A | * 3/1999 | Okada et al. | 395/856 |

\* cited by examiner

PERIPHERAL WITH SELECTABLE CONTROL PROGRAM

This application is a division of application Ser. No. 08/774,001 filed Dec. 26, 1996, now U.S. Pat. No. 5,861,957, which was a continuation of application Ser. No. 08/286,990 filed Aug. 8, 1994, abandoned, which was a continuation of application Ser. No. 07/983,254 filed Nov. 30, 1992, abandoned, which was a continuation of application Ser. No. 07/679,111 filed Apr. 2, 1991, abandoned.

BACKGROUND OF THE INVENTION

1. Field of the Invention

This invention relates to an image outputting apparatus which outputs images on the basis of printing information input from a host, and particularly to an image outputting apparatus which outputs images on the basis of printing information input from a host in conformity with a command system memorized by a memory medium such as a cartridge.

2. Related Background Art

An apparatus of this type has heretofore been designed such that a character code and a control command output from a data supply source such as a host computer are given and received and the character code and the control command input analyzed to generate a character pattern which is an object to be printed, and the generated character pattern is developed, for example, into a frame buffer corresponding to one page and is output to the print driving circuit of a printer, whereby a desired character and an image can be output.

However, the control command system output from the data supply source such as the host computer is a command system inherent to each printer maker and therefore, usually, the printer of one maker cannot be made to function as the printer of another maker, and interchangeability is low and an improvement therein has been waited for.

For this reason, in apparatuses of this type, there has been put into practical use an emulation-corresponding printer in which when a command system inherent to a printer is the native command, there is carried an emulation program for processing the command of a command system differing from this native command so that a printing process conforming to the command of a discrete system can be executed.

However, usually in an image outputting apparatus for executing the printing process by an emulation mode of this kind, design is made such that an emulator program for executing said emulation mode is memorized by a cartridge type memory medium and image outputting in the emulation mode can be executed in accordance with the user's requirement, i.e., by the user inserting the cartridge into the mounting port of image outputting means, but usually the emulator program of one emulation mode is only memorized in said cartridge type memory medium and therefore, to enhance the printing interchangeability in the image outputting apparatus body, it has been necessary to buy a plurality of such cartridge type memory mediums and mount a cartridge type memory medium corresponding to each emulation mode each time.

SUMMARY OF THE INVENTION

The present invention has been made to solve the above-noted problem and the object thereof is to provide an image outputting apparatus in which an emulation program is memorized by a cartridge type memory medium and a hard disk or the like is mounted as an auxiliary memory device and provision is made of means for copying and registering the emulation program in the cartridge onto the hard disk or the like, whereby a plurality of emulation programs are contained in the hard disk at a time and the execution of any emulation program memorized in the hard disk can be easily indicated without a cumbersome cartridge interchanging process being carried out.

In the present invention, by the emulation program being copied and registered on auxiliary memory means, it becomes possible to dismount the copied and registered emulation program cartridge and further, it also becomes possible to copy and register a second emulation cartridge in the same manner. Thereby, the user is liberated from the cumbersomeness with which the cartridge is interchanged during the changeover of the emulation program mode.

DESCRIPTION OF THE PREFERRED EMBODIMENT

Figure 1:
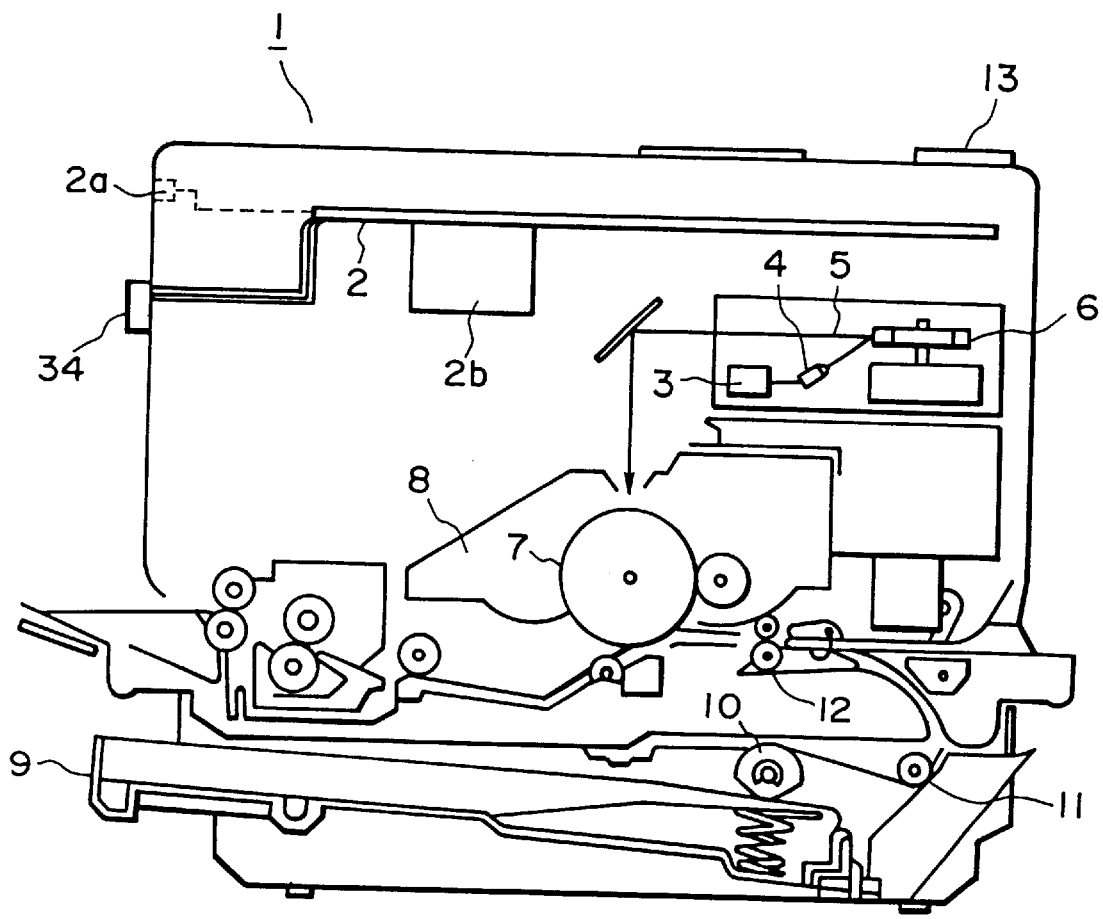
FIG. 1 is a cross-sectional view of an image outputting apparatus according to the present invention.

FIG. 1 is a cross-sectional view illustrating the construction of an image outputting apparatus according to an embodiment of the present invention.

The laser printer shown in FIG. 1 can also accomplish the registration of character patterns and form patterns from a data supply source, not shown.

In FIG. 1, the reference numeral 1 designates a body which converts character information (character code) and form information (form code), supplied from an outside host computer which will be described later into a character pattern and a form pattern corresponding thereto and images them on paper which is a recording medium. The reference numeral 2 denotes a printer control unit which controls the entire body 1 and analyzes character information, etc. supplied from the host computer, and the printer control unit 2 converts chiefly the character information into a video signal of a corresponding character pattern and outputs the converted video signal to a laser driver 3. The laser driver 3 is a circuit for driving controlling a semiconductor laser 4, and ON-OFF-changes over laser light 5 emitted from the semiconductor laser 4 in comformity with the input video signal. The laser light 5 is deflected in a direction from left to right by a rotatable polygonal mirror 6 and is applied onto an electrostatic drum (photosensitive drum) 7, whereby the latent image of the character pattern is formed on the electrostatic drum 7. This latent image is developed by a developing unit 8 around the electrostatic drum 7, whereafter the developed image is transferred to the paper. The paper used is cut sheets, which are contained in a paper cassette 9 mounted to the body 1, and the cut sheets are introduced one by one into the apparatus by a paper feeding roller 10 and conveying rollers 11 and 12, and supplied to the electrostatic drum 7. The reference numeral 13 designates an operation panel comprised of an operation switch and an indicator comprising an LED. The operation panel 13 informs of the state of the body 1.

The reference character 2a denotes a connector which provides a mounting mechanism. A program cartridge which is program supply means to be described is mounted on the connector 2a.

The reference character 2b designates a hard disk which is a large capacity auxiliary memory device. The hard disk 2b secures an area for copying and registering an emulation program in the program cartridge.

Figure 2:
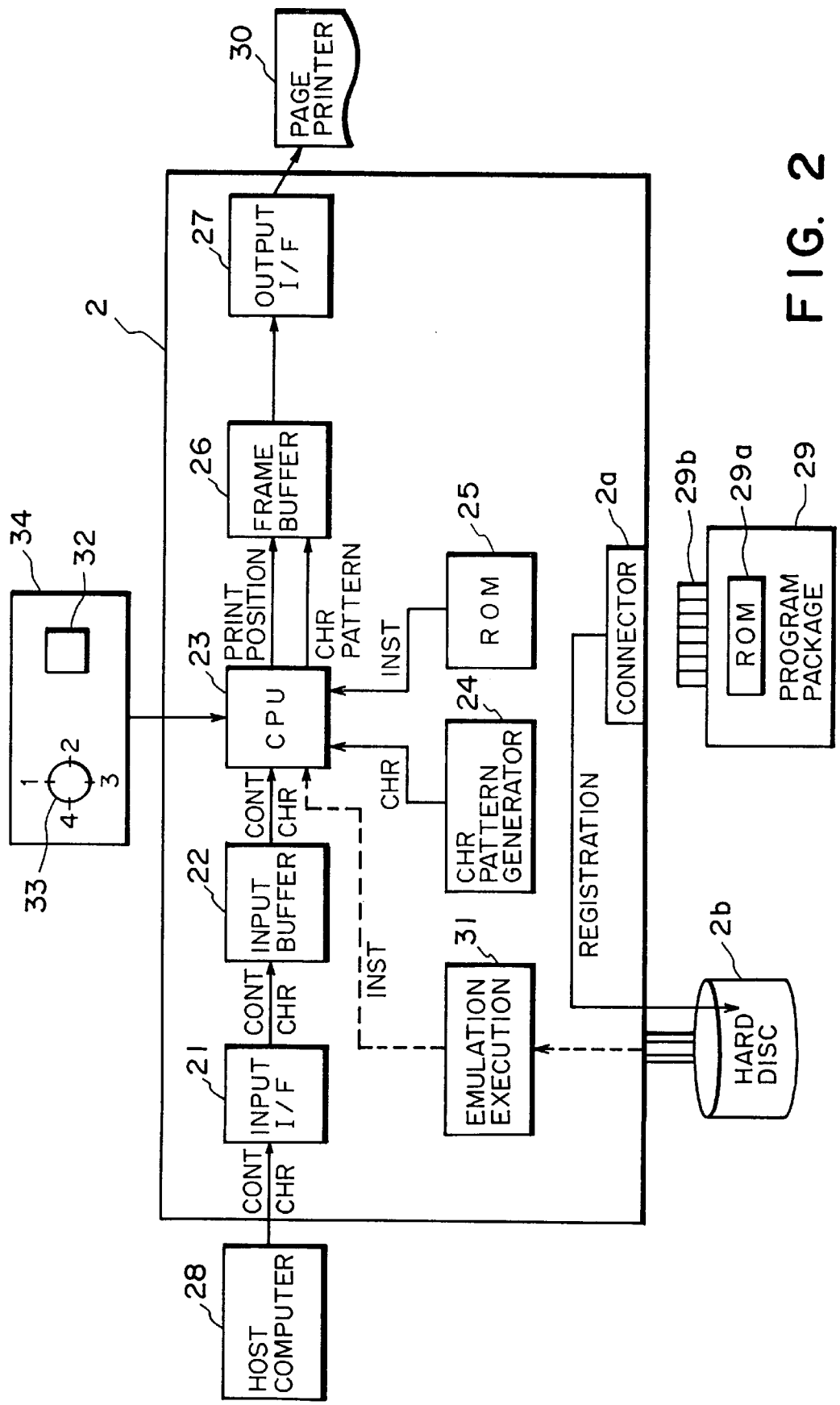
FIG. 2 is a block diagram showing the construction of the printer control unit of FIG. 1.

FIG. 2 is a block diagram illustrating the construction of the printer control unit 2 shown in FIG. 1. In FIG. 2, members identical to those in FIG. 1 are given identical reference characters.

In this figure, the reference numeral 21 denotes an input interface portion which receives a control code and a character code from a host computer 28 which is an outside apparatus, and causes them to be temporarily accumulated in an input buffer memory 22 comprising, for example, a random access memory RAM. The reference numeral 23 designates a CPU which serves also as the emulation program starting control means of the present invention. The CPU 23 executes the print information processing on the basis of a control program stored in a control program ROM 25. Particularly in the control program ROM 25, there is stored a print processing sequence during the native mode. The reference numeral 24 denotes a character pattern generator which stores therein a character font pattern corresponding to a character code in the form of a dot matrix. The reference numeral 26 designates a frame buffer memory comprising, for example, an RAM. The frame buffer memory 26 image-develops and memorizes for one page a character pattern corresponding to a predetermined character code obtained from the character pattern generator 24 at a suitable position in conformity with a printing position command input from the host computer 28.

The reference numeral 27 designates an output interface portion which generates a video signal conforming to the dot pattern information developed and memorized in the frame buffer memory 26, and outputs the video signal to a page printer portion 30 in synchronism with a print control signal. The page printer portion 30 prints image information corresponding to the video signal by the mechanism shown in FIG. 1.

Figure 3:
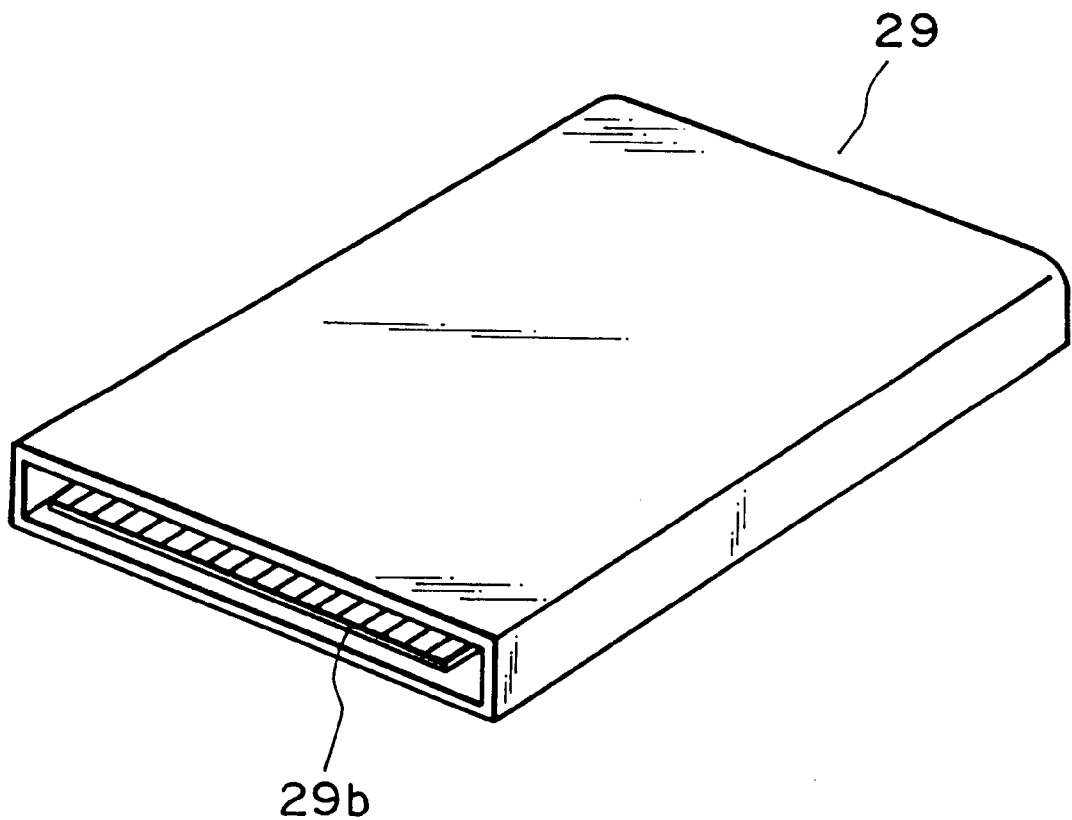
FIG. 3 is a pictorial perspective view of a program package.

The reference numeral 29 also indicated in FIG. 3 denotes a program package which provides program supply means. The program package 29 is comprised of an emulation program ROM 29a and a socket 29b for processing print information corresponding to any command system, and is designed to be removably mounted on the connector 2a.

In the emulation program ROM 29a, there is stored the emulation program P1 of the emulation program mode differing from the native mode (a parser and an execution procedure for analyzing a combination of commands (a command system) from the host computer 28 are stored as a program), and when a "copy" switch 32 on an operation panel 34 is depressed with the program package 29 mounted on the connector 2a, the CPU 23 which is emulation program copying and registering means reads out the emulation program P1 through the connector 2a and copies and registers it on the hard disk device.

It is possible to store a plurality of emulation programs on the hard disk by performing a similar operation by the use of a cartridge in which an emulation program discrete from said emulation program is stored.

It is to be understood that which of the emulation programs on the hard disk should be executed is determined by a rotary switch-like emulation program "selection" switch 33 on the operation panel 34 and follows the designation by this switch during power on. Specifically, the hard disk is generally at a low speed to fetch the emulation program and therefore, it is to be understood that a further emulation program is recopied on an emulation program execution area 31 comprising a RAM and the instruction fetch of the CPU 23 is effected from this area.

The above embodiment has been described with respect to a case where the printer control unit 2 processes the image information for the page printer portion 30 correspondingly to various emulation modes, whereas the outputting medium is not limited to a printer apparatus, but the present invention can also be applied to a CRT apparatus capable of displaying a bit map.

As described above, according to the present invention, various emulation programs can be copied and registered in various ways and therefore, for example, even when it is necessary to effect copying and registration with a plurality of emulation programs changed over, the necessary image can be output solely by a simple switch operation.

Also, according to the present invention, the inconvenience that indiscriminately many cartridge slots are provided or cartridge interchange is done frequently can be prevented.

What is claimed is:

1. A peripheral connected to a host computer, comprising:
   instruction means for providing instructions including a control program registration instruction and a control program execution instruction;
   memory means for storing a first control program for controlling said peripheral in a first fashion;
   connection means for connecting to said peripheral a logic board which provides a second control program different from the first control program stored in said memory means;
   registration means, responsive to the control program registration instruction provided by said instruction means, for registering a second control program provided by the logic board in a first internal memory, thereby registering up to a plurality of second control programs in the first internal memory;
   loading means for loading one of the second control programs registered in the first internal memory into a second internal memory from which a processor of said peripheral can fetch a control program in place of the first control program; and
   execution means, responsive to the control program execution instruction provided by said instruction means, for executing the second control program loaded into the second internal memory by said loading means, thereby controlling said peripheral in a second fashion different from the first fashion.

2. A peripheral according to claim 1, wherein the first internal memory comprises a hard disc.

3. A peripheral according to claim 1, wherein each of the plurality of second control programs comprises an emulation program.

4. A peripheral according to claim 1, wherein said peripheral comprises a printer.

5. A peripheral according to claim 1, wherein said peripheral comprises a cathode ray tube monitor.

6. A peripheral according to claim 1, wherein the second internal memory comprises a random access memory.

7. A method carried out in a peripheral connected to a host computer which comprises a program memory for storing a first control program for controlling the peripheral in a first fashion and a connection unit for connecting to the peripheral a logic board which provides a second control program different from the first control program stored in the program memory, said method comprising the steps of:

responsive to a control program registration instruction provided in the peripheral, registering a second control program provided by the logic board in a first internal memory of the peripheral, thereby registering up to a plurality of second control programs in the first internal memory;

loading one of the second control programs registered in the first internal memory into a second internal memory from which a processor of the peripheral can fetch a control program in place of the first control program; and responsive to a control program execution instruction provided in the peripheral, executing the second control program loaded into the second internal memory in said loading step, thereby controlling the peripheral in a second fashion different from the first fashion.

8. A method according to claim 7, wherein the first internal memory comprises a hard disc.

9. A method according to claim 7, wherein each of the plurality of second control programs comprises an emulation program.

10. A method according to claim 7, wherein the peripheral comprises a printer.

11. A method according to claim 7, wherein the peripheral comprises a cathode ray tube monitor.

12. A method according to claim 7, wherein the second internal memory comprises a random access memory.

* * * * *